Sept. 8, 1931.    W. F. PARADISE    1,822,170
PROCESS OF MAKING, FREEZING, AND HARDENING
ICE CREAM AND APPARATUS THEREFOR
Filed Jan. 21, 1929    2 Sheets-Sheet 1

INVENTOR.
W<sup>m</sup> F. Paradise.
BY
*E. E. Vrooman & Co.,*
*His* ATTORNEYS.

Sept. 8, 1931. W. F. PARADISE 1,822,170
PROCESS OF MAKING, FREEZING, AND HARDENING
ICE CREAM AND APPARATUS THEREFOR
Filed Jan. 21, 1929 2 Sheets-Sheet 2
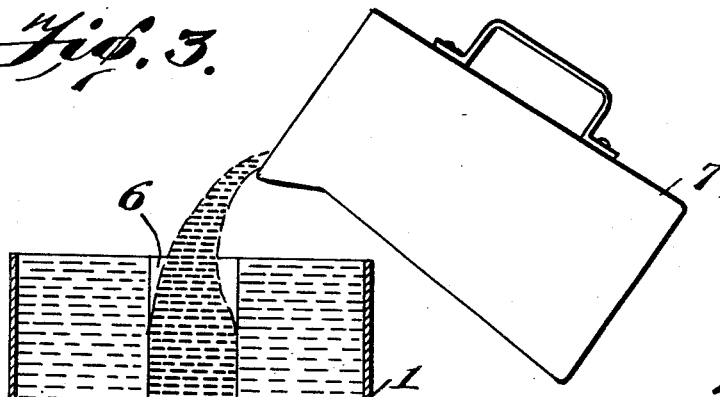
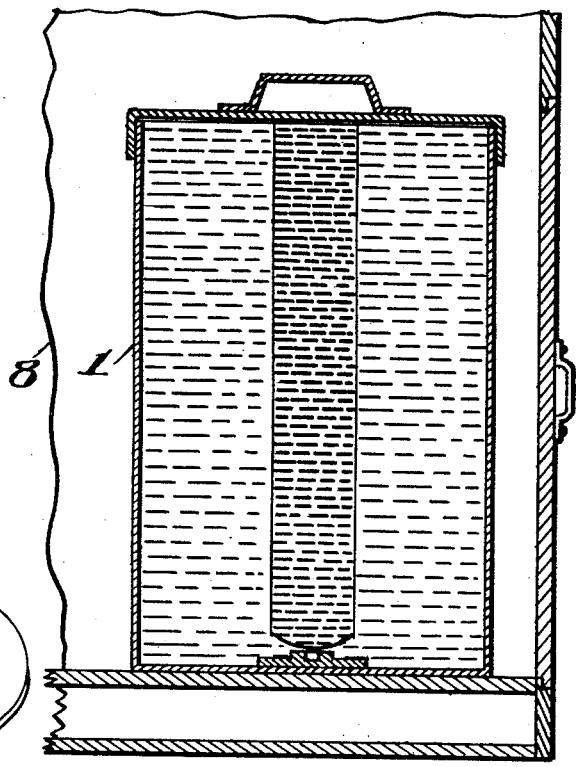
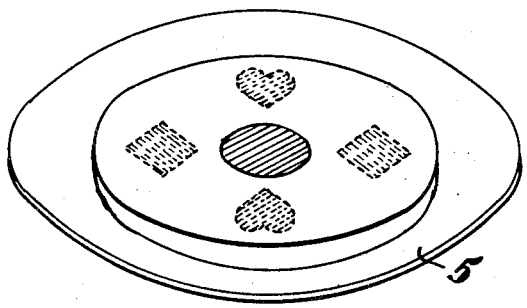
INVENTOR.
Wᵐ F. Paradise,
BY
*E. E. Vrooman & Co.*,
*His* ATTORNEYS.

Patented Sept. 8, 1931

1,822,170

UNITED STATES PATENT OFFICE

WILLIAM F. PARADISE, OF ATCHISON, KANSAS

PROCESS OF MAKING, FREEZING AND HARDENING ICE CREAM AND APPARATUS THEREFOR

Application filed January 21, 1929. Serial No. 333,848.

This invention relates to a process of making, freezing and hardening ice cream and apparatus therefor.

The object of the invention is to make ice cream and harden the same in a relatively short time.

Another object of the invention is to make an edible composition, which preferably is formed of portions or bodies of different flavors, and which mass is frozen hard in a short period.

A still further object of my process is the freezing or hardening of an edible body or mass by subjecting the same both interiorly and exteriorly to a freezing action.

With the foregoing and other objects in view, my invention comprises certain novel constructions, combinations and arrangements of parts as will be hereinafter fully described, illustrated in the accompanying drawings, and more particularly pointed out in the appended claim.

In the drawings:

Figure 3 is a vertical sectional view of a container, filled with ingredients and illustrating what might be considered the fourth step of my process.

Figure 4 is a fragmentary view of a "hardening room," with a container therein, which container is filled with ingredients such as ice cream.

Figure 5 is a perspective view of a plate having thereon a cross section slice or serving of the frozen ice cream or frozen edible produced in accordance with this process.

Figure 1:
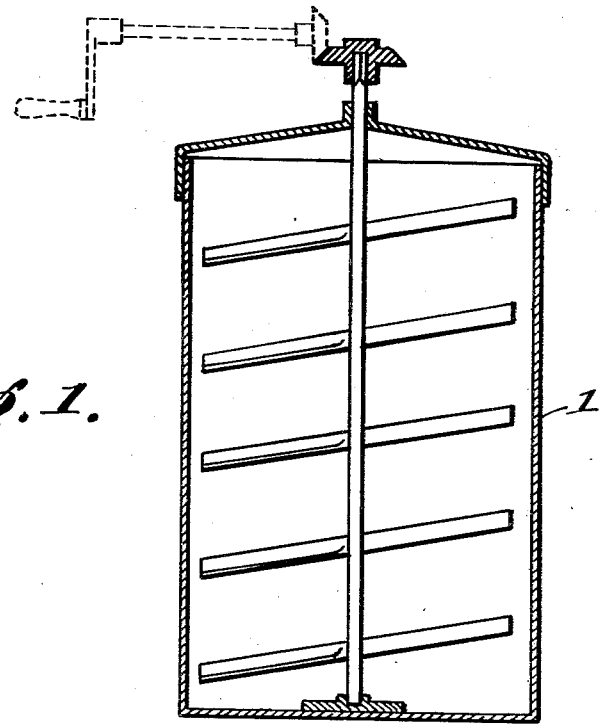
Figure 1 is a vertical sectional view of a mixing and chilling device, illustrating the first step of my process.

Referring to the drawings by numerals, 1 designates the container of the mixing and chilling device, which is employed in mixing the ingredients of the ice cream. It is to be noted that I have shown in Figure 1 the conventional form of an ordinary ice cream freezer, which if surrounded with a suitable freezing compound, such as ice and salt, would serve to chill the ingredients in the container 1.

The second step of my process entails the placing of the filled container 1 over a vat 2, and before so placing, or upon placing the container on the vat, I place a cover 3 on the container; this cover is provided with an integral open-mouth cylinder or tube 4; I use the term "tube" in a broad sense, meaning any suitable container that will hold the freezing compound in the body of the edible mass, such as ice cream. Further, I may use a plurality of tubes, as indicated by dotted lines 4a, and in cross section, these tubes 4 and 4a may be of any desirable and conventional form, as indicated in Figure 5, wherein I have shown heart and diamond shape figures in the individual helping on the plate 5.

Figure 2:
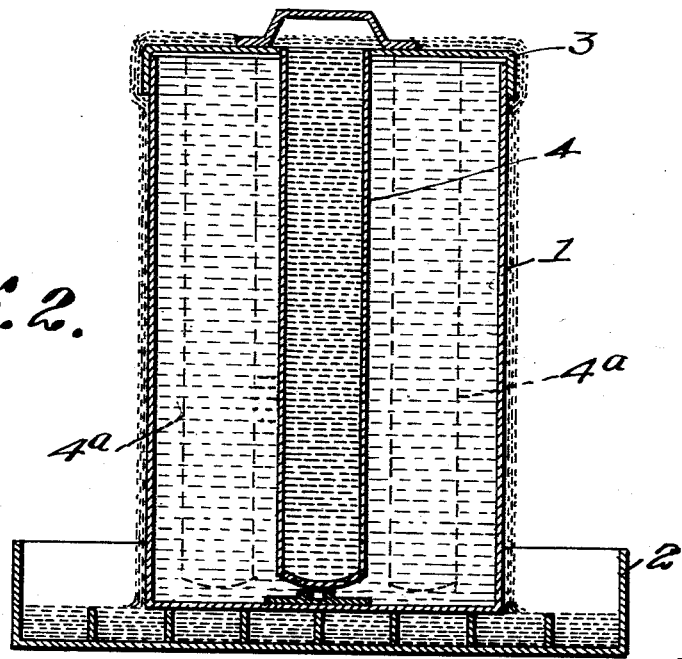
Figure 2 is a vertical sectional view of a device illustrating the second step of my process.

It is to be understood that the tube or tubes may be large enough to displace any desired proportion of the contents of the container 1. After the cover 3 is in position, as shown in Figure 2, I preferably pump or force a brine solution of freezing temperature into the tube and allow it to overflow at the top of the container down and around the same, passing back into the vat 2 containing the solution, thereby applying a freezing compound or solution to the ice cream inside the container, as well as entirely around the container on the outside, whereby the ice cream is frozen hard. In this manner the time consumed in freezing and hardening the liquid contents of the container is greatly shortened over the common method of manufacture.

The next or third step of my process of making an "inlaid" body of edibles comprises the pouring of warm water, or some other thawing solution over the container and then withdrawing or removing the cover 3 and its tube 4. Upon the removal of the cover and its depending tube or tubes, cavity 6 (Fig. 3) will be left in the frozen or hardened mass. Then I take a suitable receptacle, such as shown at 7, filled with a different flavoring of ice cream (from that of the main body) or sherbert, pouring the cavity 6 full thereof, then the container 1 is placed in the hardening room 8 to allow the "filled" portion of the ice cream to harden, whereupon all of the ice cream, whether it be of different flavors, or ice cream and sherbert, will freeze solid into one relatively hard body; this being accomplished in a very short time.

After the ice cream is removed from the hardening room in the container 1, and upon cutting transversely or horizontally across the frozen mass, each individual serving will produce an "inlaid" or mottled effect, as illustrated in Figure 5, which is very attractive and tends to increase the salability of the goods.

It is to be understood that there will be as many designs or figures equal to the number of tubes used, and as hereinbefore pointed out, these tubes can be of any ornamental structure in cross section, as the operator desires, for producing the attractive individual serving of the finished goods (Fig. 5).

While I have described the preferred embodiment of my invention and illustrated the same in the accompanying drawings, certain minor changes or alterations may appear to one skilled in the art to which this invention relates, and I therefore, reserve the right to make such changes or alterations as shall fairly fall within the scope of the appended claim.

What I claim is:

The process of making ice cream, comprising placing ice cream liquid ingredients in a container, then mixing and chilling said ingredients by agitation, then placing a cover with a depending open-top mould on said container with said mould in said ingredients, then forcing a liquid brine solution of freezing temperature into the open top of said mold and synchronously allowing said brine solution to overflow said cover and run down and entirely around said container for freezing said ingredients, then mixing a liquid thawing solution with said liquid brine solution to enable removal of the open top mold, then pouring an edible liquid into the cavity formed by said mould in said frozen ingredients, and then subjecting the entire ice cream body to a second freezing, substantially as shown and described.

In testimony whereof I hereunto affix my signature.

WILLIAM F. PARADISE.